United States Patent [19]

Spinosa et al.

[11] Patent Number: 4,506,862

[45] Date of Patent: Mar. 26, 1985

[54] FLUID HOSE CONNECTORS

[75] Inventors: Dominic J. Spinosa, Wantagh; Frank Knoll, Huntington Station, both of N.Y.

[73] Assignee: East/West Industries, Inc., Hauppauge, N.Y.

[21] Appl. No.: 507,970

[22] Filed: Jun. 27, 1983

[51] Int. Cl.³ .............................................. F16L 29/00
[52] U.S. Cl. .................................. 251/149.5; 251/149; 251/149.6; 285/86; 285/376
[58] Field of Search .................. 251/149, 149.1, 149.5, 251/149.6; 137/614.03; 285/33, 135, 267, 268, DIG. 22

[56] References Cited

U.S. PATENT DOCUMENTS

| | | | |
|---|---|---|---|
| 2,411,057 | 11/1946 | Robbins | 251/149.5 X |
| 2,459,477 | 1/1949 | Van Schuyver | 251/149.5 |
| 3,583,667 | 6/1971 | Amneus, Jr. | 251/149.5 |
| 3,589,673 | 6/1971 | Cruse | 251/149.1 |

Primary Examiner—Larry Jones
Attorney, Agent, or Firm—Leonard W. Suroff

[57] ABSTRACT

A fluid hose connector capable of resisting transverse forces to avoid inadvertent disconnection from a mating connector includes an elongated hollow body which includes a first portion that provides an extending collar to restrain the lateral movement of a mating connector and a second portion which provides for connection to a source of fluid. The body portion includes a hollow coupling for removably retaining a mating connector and a hollow plunger which is adapted to be slidably received within the coupling. The plunger is provided with a first disconnect position which prevents fluid flow through the body and a second position which permits fluid to flow therethrough. A spring disposed within the body urges the plunger to the first or disconnect position so that when the connector is not mated, it prevents fluid flow therethrough as well as providing a dust cover for the connector opening.

16 Claims, 6 Drawing Figures

FIG. 1A  FIG. 1B
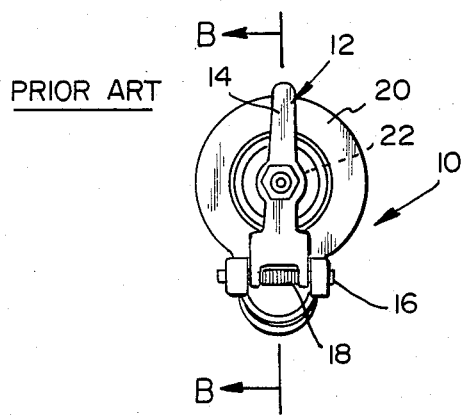
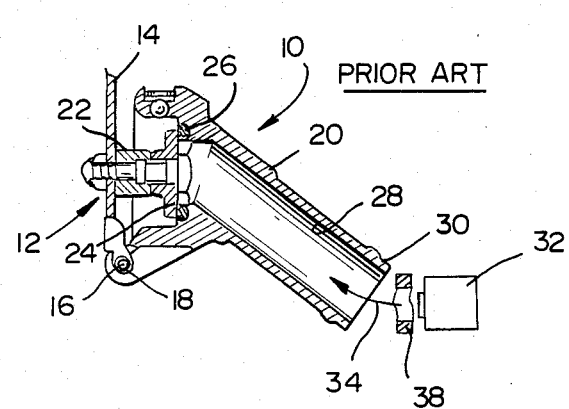
FIG. 2
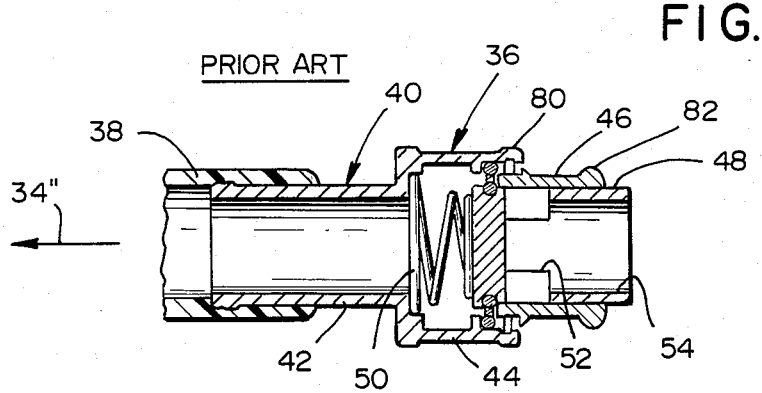
FIG. 3
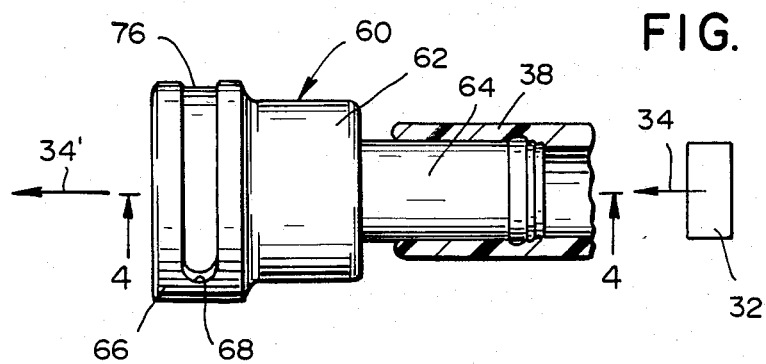

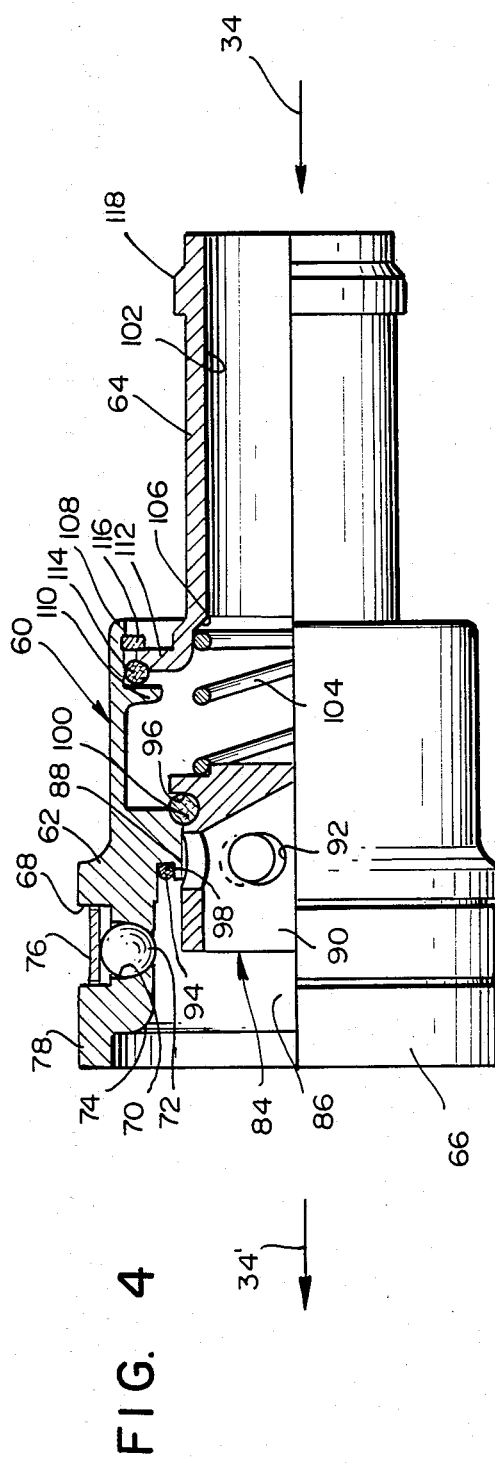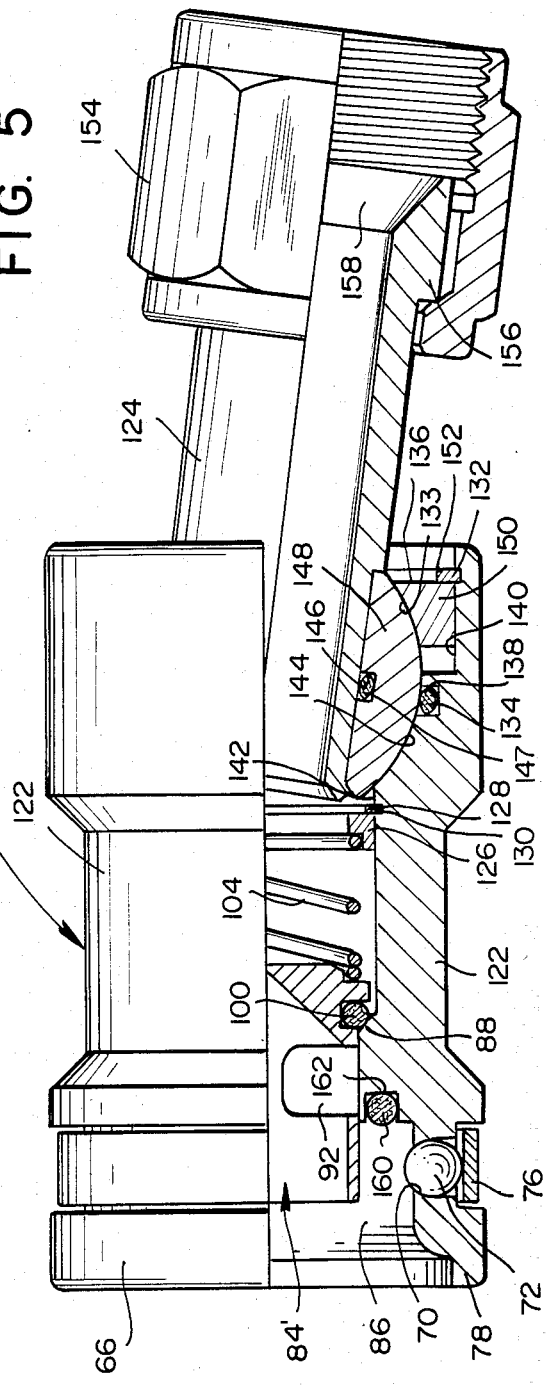

FLUID HOSE CONNECTORS

BACKGROUND OF THE INVENTION

1. Field of the Invention

The present invention relates to fluid hose connectors, and in particular, to a fluid hose connector that avoids disconnection by transverse forces and provides a dust cover seal for the fluid flow path when not in use.

2. Discussion of the Relevant Art

Many types of connectors have been in use over the years for connecting fluid from a pressurized source to a using device or mechanism. These include connectors for coupling compressed air, liquids such as water, etc. between two points. Generally, these connectors connect the using device to the source of fluid by providing a continuous fluid flow path relying on a valve located near the source of pressurized fluid to control the fluid flow. The connection is typically made without pressure in the system or any fluid flowing. Thereafter the valve is activated (opened) to pressurize the system. In certain applications, however, it becomes necessary to maintain the system under pressure and connection must be made thereto in a rapid, efficient manner without causing the pressurized system to lose its pressure or provide excessive leakage to surrounding atmosphere. The connector of this type has found use in supplying oxygen to aviators when flying at high altitudes or under conditions wherein the aviator or pilot could not survive without receiving air (typically oxygen) for breathing. Under these conditions, the pilot must be able to make connection to the source of pressurized oxygen in a rapid manner and yet still maintain his ability to move freely to conduct his various tasks. Movement of the pilot, once connected to a pressurized system for breathing, becomes critical since any inadvertent or sudden movement which causes pressure to be exerted on the mating connectors could disconnect or dislodge them, cutting off the pilot from his source of oxygen.

It also becomes necessary to provide a dust cover so that when the system is turned off, dust particles or other debris may be kept from the fluid flow path. Any debris entering the fluid flow path while the system is depressurized will be forced into the connecting device, pilot's breathing mechanism, etc. when the system becomes pressurized and connection is made thereto. Thus, it becomes necessary to provide a connector capable of performing both functions, although the requirements may occur at different times.

Therefore, it is an object of the present invention to provide a connector that resists lateral forces, once mated, to prevent disconnection but allows disconnection in a straight line pull with a pull force of 12 to 20 pounds, while inadvertent side disconnection is discouraged.

It is another object of the present invention to provide a fluid connector which when disconnected provides a dust cover or seal for the fluid flow path.

It is yet another object of the present invention to provide a fluid connector suitable for use under extreme environmental conditions such as temperature and humidity and is capable of a maximum of connect and disconnect cycles.

It is still another object of the present invention to provide a fluid connector that is capable of sealing a pressurized fluid system and will show no signs of leakage up to forty pounds per square inch and has quick disconnect capabilities.

The foregoing and other objects and advantages will appear from the description to follow. In the description, reference is made to the accompanying drawing which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense and the scope of the present invention is best defined by the appended claims.

SUMMARY OF THE INVENTION

A fluid hose connector, according to the principles of the present invention, comprises an elongated hollow body having a first portion which includes a means for restraining lateral movement of a mating connector and a second portion which has a means for connection to a source of fluid. A hollow coupling mechanism is disposed within the first body portion for mating with and removably retained by a mating connector. A hollow plunger, closed at one end, is slidably received within the hollow coupling and the first body portion and is provided with a first disconnect position in which fluid is prevented from flowing through the body and a second or connect position which permits fluid to flow through the body. A spring disposed within the first body portion urges the plunger into the first or disconnect position when the connector is not mated.

BRIEF DESCRIPTION OF THE DRAWING

In order that the invention may be more fully understood, it will now be described, by way of example, with reference to the accompanying drawing in which:

FIG. 1A is a front view of a prior art female connector;

FIG. 1B is a cross-sectional view along the line B—B of FIG. 1A;

FIG. 2 is a cross-sectional view of a prior art male connector;

FIG. 3 is a view in elevation of a female connector according to the principles of the present invention;

FIG. 4 is an enlarged view in elevation, partially broken away of the connector of FIG. 3; and FIG. 5 is a greatly enlarged view in elevation of an alternative embodiment of the present invention with a portion thereof broken away for clarity.

DESCRIPTION OF THE PREFERRED EMBODIMENTS

Referring now to the figures, and in particular to FIGS. 1A and 1B, there is shown a prior art connector 10 which includes a dust cover flap 12 that includes an arm 14 pivoted about an axis provided by a pivot pin 16 which has affixed thereon, in a conventional manner, a coil spring 18 that applies pressure against the arm 14 to urge it towards the connector housing 20. Affixed to the arm 14 is a plunger 22 which is provided with a seal 24. Seal 24 is urged into contact with an O-ring packing material 26 provided about the opening 28 in the housing 20 providing a fluid flow path therethrough. The remote end 30 of the housing 20 is adapted to be connected by means of a flexible or rigid hose to a source of pressurized fluid 32, preferably oxygen under pressure, which will be discharged and will flow in the direction of arrow 34. The pressure from the fluid source must be overcome by the spring 18 in order to provide a seal for the fluid flow path (opening 28) when the system is pressurized and when the system is not pressurized, the system is sealed from debris and dust by the seal 24 covering the opening 28.

A mating male connector 36, adapted to be received by the female connector 10 shown in FIGS. 1A and 1B, is shown in cross-section in FIG. 2. The male connector 36 is affixed to a flexible hose 38 connected or extending from a flight suit or other apparatus into which the fluid flowing in the fluid flow path, designated by arrow 34, 34′ or 34″ must be received. Male connector 36 is provided with a one-piece body 40 which has a narrow portion 42 onto which a flexible hose 38 may be affixed, in a conventional manner. The larger portion 44 of the body 40 includes a coupling member 46 that is rigidly retained by the larger portion 44 of the body 40, in a conventional manner. Slidably retained in the coupling member 46 is a plunger 48 which is urged towards its most outwardly extending position by a spring 50. Plunger 48 is provided with a plurality of apertures 52 and the wall thereof, thereby permitting the fluid to flow through the opening 54 provided therein through the apertures and through the other hollow portion of the housing or body 40 where it can exit as shown, via the arrow 34″.

A fluid connector 60, according to the principles of the instant invention, is shown in elevation in FIG. 3. The connector disclosed therein overcomes the shortcomings found in the devices heretofore utilized. The major shortcoming of the male connector 36 when inserted into the female connector 10 is its susceptibility to lateral forces, that is, forces exerted inadvertently or purposefully, transverse to the axis of the connector will dislodge the male connector from the female connector 10. In addition, female connector 10 requires a cover 12 in order to protect the fluid flow path from debris or dust entering therein. The instant connector 60 overcomes these shortcomings, as will be explained hereinafter.

The fluid connector 60 is provided with a body having a relatively larger first portion 62 and a smaller or second portion 64 which is adapted to be connected to a fluid source 34, via a flexible or rigid hose 38, which may be affixed thereon, in a conventional manner. The larger portion 62 of connector 60 is provided with an elongated coupling portion 66 which has disposed therein a circumferential C-shaped slot 68. The slot 68 is provided with a plurality of holes 70 adapted to receive a plurality of steel balls 72, with a portion thereof extending into the open portion 74 of the connector 60. The steel balls 72 are held in position by a C-shaped flat retaining spring 76, more clearly shown in FIG. 4. An extended lip portion circumferentially disposed at the edge of the larger coupling portion 66 is adapted to cooperate with and encompass the edge 80 of the male connector 36, thereby preventing any lateral movement of the male connector. A protrusion or lip portion 82, circumferentially disposed about the periphery of the edge 80 of the male connector 36, urges the steel balls 72 outwardly in the holes 70. Thus when the steel balls return by pressure exerted by the retaining spring 76, the male connector 36 is retained within the female opening of the connector 60.

Although a female connector is described herein, the principles disclosed may readily be applied to a male connector as well.

A hollow closed bottomed plunger 84 is slidably received into the hollow opening 86 of the larger portion 62 of the housing 60 and is in frictional contact with an internally circumferentially disposed shelf 88 provided in the larger portion 62. The plunger walls 90 are provided with a plurality of apertures 92, the function of which will be explained hereinafter. The external circumference of the plunger is provided with a relatively small channel 96 into which is placed an O-shaped packing ring 100. O-shaped ring 100, when placed in contact with the shelf 88, seals the connector 60, thereby preventing any air flow therethrough. When plunger 84 is urged further into the connector, O-shaped packing means 98 comes in contact with shelf 88, thereby permitting air flow entering the aperture 102, provided in the smaller portion 64 of the connector, to flow through aperture 92 and therefore out the opening 86 into the associated or mating male connector inserted therein.

The embodiment shown in FIG. 4 includes an additional O-shaped packing ring material 98 disposed into channel 94 provided in the larger portion 60 to additionally face seal the male connector when it enters the female connector disclosed and comes into contact therewith.

A spring 104 disposed between one end of the plunger 84 and a protruding portion 106 provided on the internal surface of the smaller portion 64 and disposed at the juncture of the larger portion 62 and 64 urges the plunger to cause the O-shaped packing material to seal off the fluid flow through the connector unless displaced by a male mating connector as explained hereinbefore. Spring 104 is preferably of the coil type.

Proximate the other end of the larger portion 62 of connector 60 a relatively small channel or rolled lip portion 108 is provided. Also provided is a second internally disposed lip portion 110 circumferentially disposed about the inner surface proximate the same end but a little more remote therefrom.

One end of the smaller portion 64 of the connector 60 is provided with a circumferentially outwardly extending lip portion 112 which is adapted to be received within the opening of the larger portion 62 of the connector 60, and sandwiched between the lip portion 112 and lip portion 110 is an O-shaped packing ring or material 114. A C-shaped retaining ring 116 is inserted into a channel or urged beneath the lip portion 108, thereby removably retaining the smaller portion 64 within the larger portion 62 of the connector 60. The other end of the smaller portion 64 is provided with an outwardly extending circumferentially disposed protrusion 118 which is adapted to receive a hose thereon in a conventional manner, which is connected to a source of fluid, preferably under pressure, as explained hereinbefore.

Refer now to FIG. 5, which discloses an alternative embodiment 120 of the fluid connector of the instant invention. The connector 120 is fabricated from two major assemblies: a larger body portion 122 and a smaller portion 124, generally referred to as the swivel ball assembly. Like numerals have been applied to elements which are the same as or similar to elements utilized in the embodiment disclosed hereinbefore.

The larger portion 122 includes the coupling portion 66 as appeared in the earlier described embodiment including the peripherially disposed steel balls 72 and retaining ring therefor 76. The extending lip 78, to restrict lateral movement of a mating connector, is also included herein. A plunger 84' is generally similar to the plunger 84 of the other embodiment with apertures 92 included in the side walls thereof. However, only one O-shaped packing ring is included proximate one end of the plunger 84' which comes into contact with an inwardly extending shelf 88 when urged thereagainst by a spring 104. One end of the spring 104 urges the plunger 84' in a direction to close off the air flow through the connector with the other end of the spring 104 resting against an L-shaped ring 126 disposed internally in the larger portion 122 and held in place by a C-shaped retaining ring 128 disposed in a relatively small channel 130 provided therefor. Proximate the other end of the larger portion 122 and internally disposed lip or channel 132 is provided. A second relatively small channel 134 disposed more remotely from the other edge 136 of the larger portion 122 is a second channel 134 into which an O-shaped packing ring material 138 is disposed. Disposed between channels 130 and 134 is a relatively larger channel 140. The inner surface of the larger portion 122 is provided with an arcuate circumferentially disposed surface 133 which includes channel 134 and extends to a point 142 more remote therefrom, the function of which will become apparent shortly.

The smaller portion or swivel ball assembly 124 includes an arcuate radially extending surface 144, provided a generally D-shaped in cross-section member 148 with a relatively small channel 146 disposed therein that is adapted to received an O-shaped packing ring material 147 to prevent the fluid flow therearound. The D-shaped member 148 is dimensioned to forceably fit upon the smaller portion 124 of the connector 120 and is held in position by flaring the edge of smaller portion 124. The arcuate surface 144 is adapted to cooperate with the arcuate surface 133 provided about the inner surface of the larger portion 122 of connector 120. A ring-shaped washer, preferably of Teflon or nylon is inserted in channel 140. The washer 150 is provided with an arcuately-shaped inner circumferential surface which is in contact with the surface 144 provided on D-shaped member 148 and is held in position therein by a C-shaped retaining ring 152 inserted into channel 130, thereby preventing the swivel ball assembly 124 from being removed from the larger portion 122 of connector 120.

The other end of the smaller portion or swivel assembly 124 is provided with a threaded hex nut 154 rotably held thereon by a shoulder 156 provided on the external circumference of smaller portion 124. The end 158 of the portion 124, beneath nut 154, is preferably flared in a conventional manner to receive a mating connector thereon, not shown, which is of the conventional fluid type, used for a rapid sealed connection to a fluid source under pressure.

In operation, the presently disclosed female connectors shown in FIGS. 4 and 5 are readily adapted to receive the standard male connectors presently in use and with the female connector disposed in a rigid or wall position will insure that the male plugs inserted therein will not be inadvertently disconnected or removed by transverse forces applied thereto. The embodiment disclosed in FIG. 5 provides the added feature of allowing rotation of approximately thirty degrees to give the individual or equipment with a male plug inserted therein more freedom of movement and is available in the embodiment disclosed in FIG. 4.

Removal of a male connector once inserted is readily accomplished by applying a force along the axis of the female connector. Insertion of the male connector into either embodiment will cause the plunger 84 or 84' to be moved away from the mating edge thereof, thus breaking the liquid seal formed by the packing material 100 when it is urged against the internal lips or shelves 88 provided in both embodiments, thereby completing the fluid flow path through the connector.

The embodiment shown in FIG. 5 includes an additional O-shaped packing ring material 160 disposed into channel 162 provided in the larger portion 122 to additionally face seal the male connector when it enters the female connector disclosed and comes into contact therewith.

Although a female connector has been described herein, those knowledgeable in the art may readily construct a male connector having the physical attributes of the connectors disclosed herein. The plunger having two positions, a disconnect and connect position, provides for a complete seal of the fluid flow path when the male connector is removed therefrom and provides a complete, unobstructed fluid flow path when the male connector is inserted.

Hereinbefore has been disclosed a rugged, removable hose connector suitable for coupling fluid under pressure from a fluid source to a utilization device or mechanism which is rugged, resists environment extremes and will not be inadvertently disconnected by transverse forces applied thereto.

Having thus set forth the nature of the invention, what is claimed is:

1. A fluid hose connector comprising:
   A. an elongated hollow body means having;
      (i) a first body portion, including means for restraining lateral movement of a mating connector while encouraging quick disconnect capability, with
         (a) a first internally disposed lip portion at one end, and
         (b) a second internally disposed lip portion disposed proximate said one end;
      (ii) a second body portion being separable from said first body portion and including,
         (a) an externally disposed lip portion disposed at one end, and
         (b) means for connection to a source of fluid at the other end;
         (c) O-ring packing means disposed between said second lip portion and the lip portion of said second body portion;
         (d) C-shaped retaining ring means disposed between said first body first lip portion and said second body lip portion for removably retaining said second body portion within said first body portion;
   B. hollow coupling means disposed within said first body portion for mating with and adapted to be movably retained by a mating connector;
   C. hollow plunger means closed at one end, slidably received within said hollow coupling and said first body portion, said plunger means having a first disconnect position for preventing fluid flow and a second connect position for permitting fluid flow through said body; and D. spring means disposed within said first body portion for urging said plunger means into said first disconnect position when said connector is not mated.

2. A fluid hose connector according to claim 1 wherein said means for restraining lateral movement includes an extending lip portion adapted to cooperate with the body portion of said mating connector.

3. A fluid hose connector according to claim 1 wherein said coupling means includes a plurality of ball bearings disposed about the circumference thereof with a portion of said bearings extending into said hollow and a retaining spring means disposed about the circumference of said coupling means for retaining said ball bearings in position.

4. A fluid hose connector according to claim 1 wherein said hollow plunger means includes a plurality of apertures disposed in the wall of said plunger and O-ring packing means for preventing fluid flow in said first position.

5. A fluid hose connector according to claim 1 wherein said spring means comprises a coil spring disposed between said plunger means and the proximate juncture of said first body portion and said second body portion.

6. A fluid hose connector according to claim 1 wherein said second body portion is separable from said first body portion.

7. A fluid hose connector according to claim 6 wherein
A. said first body portion further includes;
   (i) a first internally disposed lip portion at one end, and
   (ii) a second internally disposed lip portion disposed proximate said one end; and
B. said second body portion includes an externally disposed lip portion at one end and means for connection to said source of fluid at the other end;
C. O-ring packing means disposed between said second lip portion and the lip portion of said second body portion; and
D. C-shaped retaining ring means disposed between said first body first lip portion and said second body lip portion for removably retaining said second body portion within said first body portion.

8. A fluid hose connector according to claim 1 wherein
A. said first body portion further includes;
   (i) a first relatively small channel disposed proximate one end,
   (ii) a second relatively small channel disposed remote from said one end,
   (iii) a third relatively large channel disposed between said first and second channels, and
   (iv) an arcuate surface circumferentially disposed about the inner surface of said first body portion including said second channel and a point more remote therefrom;
B. said second body portion including;
   (i) an arcuate radially extending surface means disposed at one end, adapted to be received by and cooperate with said first body portion arcuate surface to provide angular movement therebetween, and
   (ii) means for connection to said source of fluid at the other end;
C. O-ring packing means disposed within said second relatively small channel;
D. washer means disposed within said relatively large channel having an arcuate internally disposed surface adapted to cooperate with said second body portion arcuate surface means and provide free movement therebetween; and
E. C-shaped retaining ring means disposed within said first channel for removably retaining said second body portion within said first body portion.

9. A fluid hose connector according to claim 8 further including second O-ring packing means disposed in a relatively small channel provided proximate the other first body portion end for providing a seal with a mating connector.

10. A fluid hose connector according to claim 8 wherein said coupling means includes a plurality of ball bearings disposed about the circumference thereof with a portion of said bearings extending into said hollow and a retaining spring means disposed about the circumference of said coupling means for retaining said ball bearings in position.

11. A fluid hose connector according to claim 8 wherein said hollow plunger means includes a plurality of apertures disposed in the wall of said plunger and second O-ring packing means for preventing fluid flow in said connector in said first position.

12. A fluid hose connector according to claim 8 wherein said spring means comprises a coil spring disposed between said plunger and the juncture of said first and said second body portions.

13. A fluid hose connector according to claim 8 wherein said arcuate radially extending surface means of said second body portion is semi-circularly-shaped in cross-section and includes a relatively small channel disposed in the flat inner surface and a second O-ring packing means disposed therein to prevent fluid from leaking between said inner surface and the outer surface of said second body portion upon which it is affixed.

14. A fluid hose connector according to claim 8 wherein said means for connection to said source of fluid includes a threaded nut disposed upon the flared other end of said second body portion.

15. A fluid hose connector according to claim 8 wherein said first body portion arcuate surface includes a relatively small channel disposed therein and a second O-ring packing means disposed within said channel for preventing fluid flow between said arcuate surfaces.

16. A fluid hose connector according to claim 8 wherein said connector is a female type adapted to receive a mating male connector.

* * * * *